United States Patent
Yoo et al.

(10) Patent No.: US 12,104,042 B2
(45) Date of Patent: Oct. 1, 2024

(54) PLASTICIZER COMPOSITION AND VINYL CHLORIDE-BASED RESIN COMPOSITION INCLUDING THE SAME

(71) Applicant: Hanwha Solutions Corporation, Seoul (KR)

(72) Inventors: Myung-Ik Yoo, Daejeon (KR); Jae Song Kim, Daejeon (KR); Sung Min Ryoo, Seoul (KR); Ki Jo Sim, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 514 days.

(21) Appl. No.: 17/295,906

(22) PCT Filed: Oct. 18, 2019

(86) PCT No.: PCT/KR2019/013763
§ 371 (c)(1),
(2) Date: May 21, 2021

(87) PCT Pub. No.: WO2020/130315
PCT Pub. Date: Jun. 25, 2020

(65) Prior Publication Data
US 2022/0010096 A1     Jan. 13, 2022

(30) Foreign Application Priority Data

Dec. 21, 2018 (KR) .......................... 10-2018-0167915

(51) Int. Cl.
*C08K 5/11* (2006.01)
*C08K 5/12* (2006.01)
*C08L 27/06* (2006.01)

(52) U.S. Cl.
CPC .................. *C08K 5/11* (2013.01); *C08K 5/12* (2013.01); *C08L 27/06* (2013.01); *C08L 2201/10* (2013.01)

(58) Field of Classification Search
CPC .. C08K 5/11; C08K 5/12; C08L 27/06; C08L 2201/10
See application file for complete search history.

(56) References Cited

U.S. PATENT DOCUMENTS

| | | | |
|---|---|---|---|
| 2005/0020718 A1* | 1/2005 | Gosse | C08K 5/0016 523/105 |
| 2010/0298477 A1 | 11/2010 | Godwin | |
| 2011/0061714 A1 | 3/2011 | Keller | |
| 2014/0315021 A1 | 10/2014 | Naert et al. | |
| 2017/0015810 A1 | 1/2017 | Miyazaki et al. | |
| 2017/0349715 A1* | 12/2017 | Sevinc | B32B 25/08 |
| 2018/0105673 A1 | 4/2018 | Schilling, III et al. | |

FOREIGN PATENT DOCUMENTS

| | | | |
|---|---|---|---|
| CN | 107075218 | | 8/2017 |
| EP | 0 358 181 | * | 9/1989 |
| JP | H03-128977 | | 5/1991 |
| JP | 2015-044890 | | 3/2015 |
| JP | 2015-217608 | | 12/2015 |
| JP | 2015-223700 | | 12/2015 |
| JP | 2016-022708 | | 2/2016 |
| JP | 2017-014480 | | 1/2017 |
| JP | 2017-115043 | | 6/2017 |
| JP | 6246527 | | 12/2017 |
| JP | 6246528 | | 12/2017 |
| KR | 10-2008-0105341 | | 12/2008 |
| KR | 10-2016-0047221 | | 5/2016 |
| KR | 10-2016-0139001 | | 12/2016 |
| KR | 10-1889540 | | 8/2018 |
| WO | 2014-195056 | | 12/2014 |
| WO | 2017-162723 | | 9/2017 |
| WO | 2017-183874 | | 10/2017 |
| WO | 2018-075663 | | 4/2018 |

OTHER PUBLICATIONS

KIPO, PCT Search Report & Written of PCT/KR2019/013763 dated Feb. 4, 2020.

* cited by examiner

*Primary Examiner* — Doris L Lee
(74) *Attorney, Agent, or Firm* — LEX IP MEISTER, PLLC

(57) ABSTRACT

Provided are a plasticizer composition having excellent low-temperature characteristics and capable of improving migration of a plasticizer, and a vinyl chloride-based resin composition including the same.

6 Claims, No Drawings

PLASTICIZER COMPOSITION AND VINYL CHLORIDE-BASED RESIN COMPOSITION INCLUDING THE SAME

BACKGROUND OF THE INVENTION

(A) Field of the Invention

The present invention relates to a plasticizer composition having excellent low-temperature characteristics and capable of improving migration of a plasticizer, and a vinyl chloride-based resin composition including the same.

(b) Description of the Related Art

A vinyl chloride-based resin, which is a homopolymer of vinyl chloride and a hybrid polymer containing 50% or more of vinyl chloride, is one of general-purpose thermoplastic resins prepared by suspension polymerization and emulsion polymerization. Among them, the polyvinyl chloride-based resin prepared by emulsion polymerization is processed in the form of plastisol or granules by mixing plasticizers, stabilizers, fillers, blowing agents, pigments, viscosity depressants, titanium dioxide ($TiO_2$), and auxiliary raw materials, and is used in a wide range of applications such as flooring materials, wallpaper, tarpaulin, artificial leather, toys, automobile undercoating materials, etc. through a coating molding, extrusion molding, injection molding, or calendar molding processing method.

Particularly, interior materials, such as wallpaper, flooring materials, etc., are the most exposed product in residential and office space, and 60% or more thereof are prepared using vinyl chloride-based resins. Recently, the most important issue in wallpapers and flooring materials is related to environment-friendly wallpapers. The criteria for environmental friendliness are determined by the HB grade (3 grades: very good, good, moderate), which is graded based on the amount of emission of volatile organic compounds (VOCs) being implanted in the Air Cleaning Association, and the presence or absence of phthalate-based plasticizers (DEHP, BBP, DBP, DINP, etc.), which are considered as suspicious substances of environmental hormones in Korea.

In the vinyl chloride-based resin compositions for wallpapers and flooring materials, the plasticizers are liquid components that occupy the largest content, and examples thereof include phthalate-based products such as di-2-ethylHexyl phthalate (DEHP), di-isononyl phthalate (DINP), di-iso-decyl phthalate (DIDP), butyl benzyl phthalate (BBP), and di-n-butyl phthalate (DBP). In particular, DINP has been widely used.

However, the phthalate-based plasticizers, which are endocrine disrupters that interfere or disrupt the human hormonal actions, are socially considered suspicious as environmental hormones. Thus, there is a movement to regulate the phthalate plasticizers. Accordingly, it has been recently reported an example of using a non-phthalate-based plasticizer instead of a phthalate-based plasticizer.

For example, Korean Patent Publication No. 2008-0105341 discloses that DOTP, which is a non-phthalate-based plasticizer, is used alone or in combination with di-isononyl phthalate (DINP). Since DOTP is not a phthalate-based plasticizer, it can stay away from the controversy over environmental hormones, but there is no advantage in terms of physical properties and a problem in compatibility with additives (stabilizer, additives for reducing viscosity) used as raw materials for existing products, and various problems such as deterioration of foamability during wallpaper production and a rapid increase in viscosity during winter have been found.

In addition to DOTP, there exists di(2-ethylhexyl)cyclohexane-1,4-dicarboxylate (DEHCH) among the non-phthalate-based plasticizers, and it has a low viscosity at room temperature and at low temperatures, and thus may implement excellent coating properties, and has a fast gelling rate and excellent forming properties. Especially, there is substantially no environmental problems just as phthalate-based plasticizers, and thus DEHCH has been attracting attention as a plasticizer for vinyl chloride resins.

However, despite the various advantages of DEHCH as described above, DEHCH has many limitations in its use for wallpapers because the migration characteristics to paper are worse than those of existing environmentally friendly plasticizers. The migration of the plasticizer refers to a phenomenon in which the plasticizer is once present in the vinyl chloride-based resin and gradually flows out of the vinyl chloride-based resin over time, and this is an important factor limiting the use thereof in flooring materials, wallpaper, tarpaulin, artificial leather, toys, automotive undercoating materials, etc., which may have a direct impact on the human body.

In order to improve such migration, Korean Patent Publication No. 2016-0047221 discloses a plasticizer composition including DEHCH and a citrate-based compound. However, the plasticizer composition in the Korean publication document has limitations in its use due to the unpleasant odor peculiar to the citrate plasticizer and high temperature volatilization of the plasticizer.

The migration of the plasticizer is somewhat difficult to predict because it is strongly influenced by physical/chemical properties between the plasticizer and the vinyl chloride-based resin. Therefore, the migration characteristics should be evaluated by applying various plasticizers.

Meanwhile, when a product including a plasticizer is used outdoors, the plasticizing effect of the plasticizer is rapidly deteriorated in cold winter or in cold regions such as Russia and North America, resulting in a low flexibility and a problem of being easily broken even with a small impact.

Accordingly, there is a need to develop an environment-friendly plasticizer that prevents migration and has excellent low-temperature characteristics.

SUMMARY OF THE INVENTION

To solve the above problems, there is provided an environment-friendly plasticizer capable of improving migration characteristics of a plasticizer and has excellent low-temperature characteristics.

There is also provided a vinyl chloride-based resin composition including the plasticizer composition.

There is also provided a molded article including the vinyl chloride-based resin composition.

To achieve the above objects, an aspect of the present invention provides a plasticizer composition including di(2-ethylhexyl)cyclohexane-1,4-dicarboxylate and di(2-ethylhexyl)adipate.

Another aspect of the present invention provides a vinyl chloride-based resin composition including a vinyl chloride-based resin and the plasticizer composition.

A plasticizer composition according to the present invention may improve migration, low-temperature characteristics, and haze of a plasticizer by including di(2-ethylhexyl)cyclohexane-1,4-dicarboxylate together with di(2-ethylhexyl)adipate.

Accordingly, a vinyl chloride-based resin composition including the plasticizer composition of the present invention may solve environmental problems and may maintain good properties as a plasticizer even at low temperatures, and thus it may be used in flooring materials, wallpaper, tarpaulin, artificial leather, toys, automotive undercoating materials, etc.

DETAILED DESCRIPTION OF THE EMBODIMENTS

The terms used in this description are just for explaining exemplary embodiments and it is not intended to restrict the present invention. The singular expression may include the plural expression unless it is differently expressed contextually.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, a plasticizer composition and a vinyl chloride-based resin composition including the same will be described in more detail according to specific embodiments of the present invention.

Plasticizer Composition

A plasticizer composition according to the present invention may remarkably improve migration, low-temperature characteristics, and haze of a plasticizer due to an interaction between two kinds of specific plasticizers.

The plasticizer composition according to one embodiment of the present invention includes di(2-ethylhexyl)cyclohexane-1,4-dicarboxylate and di(2-ethylhexyl)adipate.

The di(2-ethylhexyl)cyclohexane-1,4-dicarboxylate is a compound represented by the following Chemical Formula 1, and is also called DEHCH as an abbreviation in English:

[Chemical Formula 1]

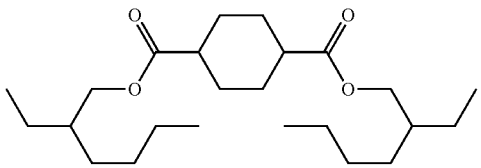

DEHCH has a low viscosity at room temperature and at low temperatures and thus may implement excellent coating properties, and has a fast gelling rate and excellent foaming property. In particular, DEHCH may minimize generation of volatile organic compounds, as compared to existing phthalate-based plasticizers, and thus it may replace the phthalate-based plasticizers. Even when DEHCH is used alone as a plasticizer of a vinyl chloride-based resin, the physical properties of the vinyl chloride-based resin may be implemented, but DEHCH has a problem of high migration, as compared to the phthalate-based plasticizers.

The migration of the plasticizer refers to a phenomenon in which a part of the plasticizer mixed with a polymer resin flows out of the polymer resin, and when some plasticizer (generally, phthalate) that flow out enters the body, it may inhibit the normal activity of the endocrine system directly involved in the life activity or may trigger an abnormal reaction to cause lethal harm, and thus the migration of the plasticizers should be inhibited as much as possible.

Meanwhile, to prevent the plasticizing effect of the plasticizer from deteriorating in cold winter or in cold regions such as Russia and North America and to maintain flexibility thereof, it is necessary to use a plasticizer having improved low-temperature characteristics.

Therefore, the plasticizer composition according to the present invention is used by mixing DEHCH with another plasticizer di(2-ethylhexyl)adipate. When the mixture is used, it is possible to further inhibit migration and to obtain the effect of improving the low-temperature characteristics and haze simultaneously while maintaining the superior characteristics as the plasticizer.

The di(2-ethylhexyl)adipate is a compound represented by the following Chemical Formula 2, and is also called DEHA as an abbreviation in English:

[Chemical Formula 2]

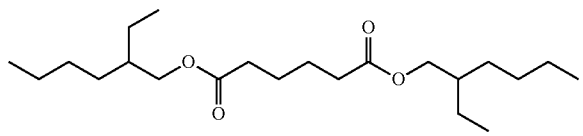

DEHA has an advantage of excellent low-temperature characteristics, but it has a disadvantage in that migration and haze characteristics of a product become inferior when used excessively.

According to the plasticizer composition of the present invention, when a mixture of DEHCH and DEHA is used, superior characteristics as the plasticizer, inhibition of migration, and the effects of improving the low-temperature characteristics and haze were achieved at the same time.

According to one embodiment of the present invention, a weight ratio of di(2-ethylhexyl)cyclohexane-1,4-dicarboxylate and di(2-ethylhexyl)adipate may be 95:5 to 50:50. More specifically, the weight ratio may be 95:5 to 50:50, 95:5 to 60:40, or 90:10 to 60:40.

When the weight ratio of di(2-ethylhexyl)cyclohexane-1,4-dicarboxylate and di(2-ethylhexyl)adipate is within the above ratio, it is possible to inhibit migration and to further improve the low-temperature characteristics and haze. In particular, Considering the optimal balance of the migration and low-temperature characteristics, the weight ratio may be most preferably 90:10 to 60:40.

According to one embodiment of the present invention, the plasticizer composition may not include plasticizer compounds other than the above described DEHCH and DEHA. In other words, the plasticizer composition may be composed of only DEHCH and DEHA.

Vinyl Chloride-Based Resin Composition

Further, according to another embodiment of the present invention, provided is a vinyl chloride-based resin composition including a vinyl chloride-based resin and the plasticizer composition. More specifically, the vinyl chloride-based resin composition may include 30 parts by weight to 70 parts by weight, parts by weight to 70 parts by weight, or 50 parts by weight to 70 parts by weight of the plasticizer composition, based on 100 parts by weight of the vinyl chloride-based resin.

The vinyl chloride-based resin composition includes the plasticizer composition according to the present invention, thereby further improving migration, low-temperature characteristics, and haze of the plasticizer. As the vinyl chloride-based resin, a polyvinyl chloride (PVC) having a degree of polymerization of 700 to 1,200 may be used, but is not limited thereto.

Throughout this specification, the vinyl chloride-based resin refers to a vinyl chloride-based monomer alone or a (co)polymer in which a vinyl chloride-based monomer and a comonomer copolymerizable therewith are copolymerized. In addition, the vinyl chloride-based resin may be prepared by mixing with a suspension agent, a buffer agent, and a polymerization initiator according to a polymerization method such as suspension polymerization, micro-suspension polymerization, emulsion polymerization, mini-emulsion polymerization, etc.

Other monomers copolymerizable with the above-described vinyl chloride monomer may include, for example, vinyl ester-based monomers including ethylene vinyl acetate monomers and vinyl propionate monomers; olefin-based monomers including ethylene, propylene, isobutyl vinyl ether, and halogenated olefins; methacrylic acid ester-based monomers including methacrylic acid alkyl esters; maleic anhydride monomers; acrylonitrile monomers; styrene monomers; and halogenated polyvinylidene, etc., and a copolymer may be prepared by mixing one or more of these monomers with a vinyl chloride monomer. However, the present invention is not limited to the above-described monomers, and according to the physical properties or uses of the vinyl chloride-based resin composition required at the time of preparation, any monomer which may be generally used in preparing a copolymer through a polymerization reaction with the vinyl chloride monomer in the art to which the present invention pertains may be used without particular limitation.

The vinyl chloride-based resin composition may further include any one or more selected from the group consisting of additives, for example, a stabilizer, a blowing agent, a filler, and titanium dioxide ($TiO_2$). The additive may be appropriately selected according to the physical properties to be improved in the vinyl chloride-based resin composition. The stabilizer is added for the purpose of preventing changes of various physical properties caused by the cleavage of the main chain and crosslinking by forming a polyene structure, which is a chromophore, upon separation of HCl from the vinyl chloride-based resin, and includes any one or more selected from the group consisting of Ca—Zn-based compounds, K—Zn-based compounds, Ba—Zn-based compounds, organic Tin-based compounds; metallic soap-based compounds, phenol-based compounds, phosphoric acid ester-based compounds or phosphorous acid ester-based compounds. More specific examples of the stabilizers which may be used in the present invention include Ca—Zn-based compounds; K—Zn-based compounds; Ba—Zn-based compounds; organic Tin-based compounds such as mercaptide-based compounds, maleic acid-based compounds or carboxylic acid-based compounds; metallic soap-based compounds such as Mg-stearate, Ca-stearate, Pb-stearate, Cd-stearate, Ba-stearate, etc.; phenol-based compounds; phosphoric acid ester-based compounds; or phosphorous acid ester-based compounds, etc., and may be optionally included depending on the purpose of use. In the present invention, a K—Zn-based compound is particularly used, and a K—Zn-based complex organic compound is preferably used.

The stabilizer is preferably included in an amount of 0.5 parts by weight to 7 parts by weight, and more preferably in an amount of 1 part by weight to 4 parts by weight, based on 100 parts by weight of the vinyl chloride-based resin. When the content of the stabilizer is less than 0.5 parts by weight, there is a problem of poor thermal stability, whereas when the content of the stabilizer is more than 7 parts by weight, there is a problem of poor processability.

The blowing agent used in the present invention includes any one or more selected from chemical blowing agents, physical blowing agents, and a mixture thereof.

The chemical blowing agent is not particularly limited, as long as it is a compound which is decomposed at a specific temperature or higher to produce gas, and may be exemplified by azodicarbonamide, azodiisobutyro-nitrile, benzenesulfonhydrazide, 4,4-oxybenzene sulfonyl-semicarbazide, p-toluene sulfonyl semicarbazide, barium azodicarboxylate, N,N'-dimethyl-N,N'-dinitrosoterephthalamide, trihydrazino triazine, etc. sodium bicarbonate, potassium bicarbonate, ammonium bicarbonate, sodium carbonate, ammonium carbonate, etc. may also be exemplified.

Further, the physical blowing agent may include inorganic blowing agents such as carbon dioxide, nitrogen, argon, water, air, helium, etc., or organic blowing agents such as aliphatic hydrocarbon compounds including 1 to 9 carbon atoms, aliphatic alcohols including 1 to 3 carbon atoms, halogenated aliphatic hydrocarbon compounds including 1 to 4 carbon atoms, etc.

Specific examples of the compounds may include methane, ethane propane, n-butane, isobutane, n-pentane, isopentane, neopentane, etc. as the aliphatic hydrocarbon compounds; methanol, ethanol, n-propanol, isopropanol, etc. as the aliphatic alcohols; and methyl fluoride, perfluoromethane, ethyl fluoride, 1,1-difluoroethane (HFC-152a), 1, 1,1-trifluoroethane (HFC-143a), 1, 1,1,2-tetrafluoroethane (HFC-134a), 1,1,2,2-tetrafluoromethane (HFC-134), 1, 1,1, 3,3-pentafluorobutane (HFC-365mfc), 1, 1,1,3,3-pentafluoropropane (HFC.sub.13 245fa), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane, methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123), 1-chloro-1,2,2,2-tetrafluoroethane (HCFC-124), trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, dichlorohexafluoropropane, etc. as the halogenated aliphatic hydrocarbon compounds. The amount of the blowing agent is preferably 0.5 parts by weight to 5 parts by weight, based on 100 parts by weight of the vinyl chloride-based resin. When the amount of the blowing agent is too small, the amount of gas generated for blowing is too small and thus the blowing effect is insignificant or may not be expected, whereas when the amount of the blowing agent is too large, the amount of gas generated is too large so that it is difficult to expect the required physical properties.

The filler of the present invention is used for the purpose of improving the productivity and dry touch feeling of the vinyl chloride-based resin composition, and includes any one or more selected from the group consisting of calcium carbonate, talc, titanium dioxide, kaolin, silica, alumina, magnesium hydroxide, and clay.

In the vinyl chloride-based resin composition according to the present invention, the filler may be preferably included in an amount of 10 parts by weight to 150 parts by weight, and more preferably, in an amount of 50 parts by weight to 130 parts by weight. When the filler is included in an amount of less than 50 parts by weight, there is a problem of poor dimensional stability and economic efficiency, whereas when the filler is included in an amount of more than 130 parts by weight, there is a problem in that the foamed surface is poor and the processability is reduced.

The vinyl chloride-based resin composition of the present invention may improve whiteness and concealability by adding titanium dioxide ($TiO_2$). The titanium dioxide may be preferably included in an amount of 1 part by weight to 20 parts by weight, and more preferably, in an amount of 3 parts by weight to 15 parts by weight, based on 100 parts by weight of the vinyl chloride-based resin. When titanium dioxide is included in an amount of less than 3 parts by weight, the color does not appear properly after printing due to reduced whiteness and concealability, whereas when it is included in an amount of more than 15 parts by weight, there is a problem in that the foamed surface is deteriorated.

The vinyl chloride-based resin composition according to the present invention may be prepared according to a method commonly known in the art by using the vinyl chloride-based resin, the plasticizer composition, and optionally, additives. The method is not particularly limited.

The vinyl chloride-based resin composition may be used as flooring materials, wallpaper, tarpaulin, artificial leather, toys, automobile undercoating materials, etc., and particularly, may have the effects of improving the migration characteristics and the low-temperature characteristics of the plasticizer.

The vinyl chloride-based resin composition according to the present invention has a low temperature brittleness (LTB) of −41° C. or less, more specifically −41° C. or lower, −42° C. or lower, −43° C. or lower, or −44° C. or lower, as measured according to ASTM D746. As the lower limit of the temperature decreases, it is more preferable. The lower limit is theoretically not limited, but may be, for example, −60° C. or higher, −55° C. or higher, −52° C. or higher, or −50° C. or higher.

Further, the vinyl chloride-based resin composition according to the present invention may have a haze of 9% or less, more specifically, 9% or less, 8.5% or less, 8% or less, or 7.5% or less, as measured according to ASTM D1003. As the lower limit of the haze decreases, it is more preferable. The lower limit is theoretically not limited, but may be, for example, 1% or more, or 2% or more, or 3% or more.

Meanwhile, according to another aspect of the present invention, provided is a molded article including the vinyl chloride-based resin composition. The molded article may be manufactured by further adding additives, such as stabilizers, fillers, and/or blowing agents, etc. to the vinyl chloride-based resin composition, depending on the purpose of use.

The molded article may be used as flooring materials, wallpaper, tarpaulin, artificial leather, toys, automobile undercoating materials, etc., and particularly, may have the effects of improving the migration characteristics and the low-temperature characteristics of the plasticizer.

Hereinafter, the present invention will be described in more detail with reference to the following Examples. However, these Examples are only for illustrating the present invention, and the scope of the present invention is not limited thereto.

EXAMPLE

Preparation of Plasticizer Composition and Vinyl Chloride-Based Resin Composition Example 1

Di(2-ethylhexyl)cyclohexane-1,4-dicarboxylate (DEHCH) and di(2-ethylhexyl)adipate (DEHA) were mixed at a weight ratio of 9:1 to prepare a plasticizer composition.

100 parts by weight of polyvinyl chloride, 60 parts by weight of the plasticizer composition, 2.0 parts by weight of a thermal stabilizer (Songwon Industrial, 1.5 parts by weight of BZ-150T, 0.5 parts by weight of BP-251S), 2 parts by weight of an epoxy auxiliary thermal stabilizer (Songwon Industrial, E-700) were weighed and mixed using a mixer, and then kneaded using a roll mill and thus prepared.

Examples 2 to 4

Di(2-ethylhexyl)cyclohexane-1,4-dicarboxylate (DEHCH) and di(2-ethylhexyl)adipate (DEHA) were mixed at a weight ratio as described in Table 1 below to prepare each plasticizer composition. Thereafter, each vinyl chloride-based resin composition was prepared in the same manner as in Example 1.

Comparative Examples 1 to 11

Di(2-ethylhexyl)adipate (DEHA), diisononyl phthalate (DINP), or dioctyl phthalate (DOTP) was used alone, or mixed at a weight ratio as described in Table 1 below to prepare each plasticizer composition.

Thereafter, each vinyl chloride-based resin composition was prepared in the same manner as in Example 1.

TABLE 1

|  | Plasticizer (weight ratio) |
| --- | --- |
| Example 1 | DEHCH:DEHA (9:1) |
| Example 2 | DEHCH:DEHA (8:2) |
| Example 3 | DEHCH:DEHA (7:3) |
| Example 4 | DEHCH:DEHA (6:4) |
| Comparative Example 1 | DEHCH |
| Comparative Example 2 | DINP |
| Comparative Example 3 | DINP:DEHA (9:1) |
| Comparative Example 4 | DINP:DEHA (8:2) |
| Comparative Example 5 | DINP:DEHA (7:3) |
| Comparative Example 6 | DINP:DEHA (6:4) |
| Comparative Example 7 | DOTP |
| Comparative Example 8 | DOTP:DEHA (9:1) |
| Comparative Example 9 | DOTP:DEHA (8:2) |
| Comparative Example 10 | DOTP:DEHA (7:3) |
| Comparative Example 11 | DOTP:DEHA (6:4) |

Experimental Example

The vinyl chloride-based resin compositions prepared in Examples and Comparative Examples were evaluated for plasticizer migration, low-temperature characteristics, and haze as follows, and the results are shown in Table 2 below.

(1) Plasticizer Migration

Evaluation of plasticizer migration was performed as follows.

Roll mill processing (170° C., 3 minutes) and press processing (180° C., 8 minutes) were sequentially performed on the prepared vinyl chloride-based resin compositions to prepare 2 mm thick sheets, respectively. The prepared sheets were cut into circular specimens having a diameter of about 4 cm. Oil-absorbing paper made of polypropylene was placed on the top/bottom of each specimen, and left at 60° C. for 7 days under a load of 5 kg to promote plasticizer migration. After the plasticizer migration test was completed, weight change rates of the specimen and oil paper were measured.

The weight change rate of the specimen was calculated according to [(weight change of specimen/weight of specimen before test)*100], and the weight change rate of the oil paper was calculated according to [(weight change of oil paper/weight of oil paper before test)*100]. The weight loss of the specimen was equal to the weight increase of the oil paper, and therefore, in this experiment, plasticizer migration was evaluated only by the weight change rate of the specimen.

(2) Low Temperature Brittleness (LTB)

The temperature, at which 50% or more of the test specimen broke, was measured according to ASTM D746.

(3) Haze

Haze was measured according to ASTM D1003.

TABLE 2

| | Plasticizer (weight ratio) | Plasticizer migration (%) | LTB (° C.) | Haze (%) |
|---|---|---|---|---|
| Example 1 | DEHCH:DEHA (9:1) | 0.27 | −42.5 | 6.71 |
| Example 2 | DEHCH:DEHA (8:2) | 0.34 | −44.2 | 7.30 |
| Example 3 | DEHCH:DEHA (7:3) | 0.41 | −46.5 | 7.89 |
| Example 4 | DEHCH:DEHA (6:4) | 0.48 | −48.0 | 8.48 |
| Comparative Example 1 | DEHCH | 0.21 | −40.2 | 6.13 |
| Comparative Example 2 | DINP | 0.1 | −26.2 | 5.12 |
| Comparative Example 3 | DINP:DEHA (9:1) | 0.25 | −29.6 | 5.13 |
| Comparative Example 4 | DINP:DEHA (8:2) | 0.34 | −32.5 | 6.20 |
| Comparative Example 5 | DINP:DEHA (7:3) | 0.37 | −37.0 | 6.80 |
| Comparative Example 6 | DINP:DEHA (6:4) | 0.42 | −44.0 | 7.2 |
| Comparative Example 7 | DOTP | 1.42 | −38.5 | 8.90 |
| Comparative Example 8 | DOTP:DEHA (9:1) | 1.25 | −39.7 | 9.31 |
| Comparative Example 9 | DOTP:DEHA (8:2) | 1.19 | −43.8 | 9.62 |
| Comparative Example 10 | DOTP:DEHA (7:3) | 1.13 | −44.3 | 9.79 |
| Comparative Example 11 | DOTP:DEHA (6:4) | 1.00 | −48.1 | 10.2 |

Referring to Table 1, it was confirmed that the plasticizer compositions of Examples, in which DEHCH and DEHA were used in combination according to the present invention, had excellent migration, low-temperature characteristics, and haze.

In contrast, Comparative Example 1, in which DEHCH was used alone, exhibited good plasticizer migration or haze, but poor LTB of about −40° C., which is a low-temperature characteristic, indicating inferior to those in which the mixture was used.

In Comparative Examples 2 to 6, in which DINP was used alone or a mixture of DINP and DEHA was used, LTB tended to decrease as the content of DEHA increased, but it was worse than those of Examples. DINP is not classified as an eco-friendly plasticizer because it is a phthalate-based plasticizer, and its use is restricted due to many regulations. Comparative Examples 7 to 11, in which DOTP was used alone or a mixture of DOTP and DEHA was used, showed good low-temperature characteristics, but large plasticizer migration and very poor haze property.

What is claimed is:

1. A vinyl chloride-based resin composition comprising a vinyl chloride-based resin, and a plasticizer composition comprising di(2-ethylhexyl)cyclohexane-1,4-dicarboxylate and di(2-ethylhexyl)adipate, and wherein a weight ratio of di(2-ethylhexyl)cyclohexane-1,4-dicarboxylate and di(2-ethylhexyl)adipate is 95:5 to 50:50 and wherein the resin has low temperature brittleness (LTB) is −41° C. or lower, as measured according to ASTM D746, haze is 9% or less, as measured according to ASTM D1003, and wherein the plastic migration is 0.48% or lower, as measured by placing oil-absorbing paper made of polypropylene on the top/bottom of a circular specimen with a thickness of 2 mm and a diameter of about 4 cm, and leaving at 60° C. for 7 days under a load of 5 kg to promote plasticizer migration, and then calculating the weight change rate of the specimen according to [(weight change of specimen/weight of specimen before test)*100].

2. The vinyl chloride-based resin composition of claim 1, comprising 30 parts by weight to 70 parts by weight of the plasticizer composition, based on 100 parts by weight of the vinyl chloride-based resin.

3. The vinyl chloride-based resin composition of claim 1, further comprising one or more selected from the group consisting of a stabilizer, a blowing agent, a filler, and titanium dioxide ($TiO_2$).

4. The vinyl chloride-based resin composition of claim 1, wherein the plasticizer has a weight ratio of di(2-ethylhexyl)cyclohexane-1,4-dicarboxylate and di(2-ethylhexyl)adipate is 90:10 to 60:40.

5. A molded article comprising the vinyl chloride-based resin composition of claim 1.

6. The molded article of claim 5, wherein the molded article is a flooring material, wallpaper, tarpaulin, an artificial leather, a toy, or an automobile undercoating material.

* * * * *